| (12) | United States Patent | (10) Patent No.: | US 7,640,394 B2 |
|---|---|---|---|
| | Kanno et al. | (45) Date of Patent: | Dec. 29, 2009 |

(54) STORAGE APPARATUS AND SETTING METHOD FOR THE SAME

(75) Inventors: Shin-ichiro Kanno, Odawara (JP); Shoji Sugino, Odawara (JP); Toshimiti Kishimoto, Hadano (JP)

(73) Assignee: Hitachi, Ltd., Tokyo (JP)

( * ) Notice: Subject to any disclaimer, the term of this patent is extended or adjusted under 35 U.S.C. 154(b) by 352 days.

(21) Appl. No.: 11/600,163

(22) Filed: Nov. 16, 2006

(65) Prior Publication Data

US 2008/0071982 A1 Mar. 20, 2008

(30) Foreign Application Priority Data

Sep. 20, 2006 (JP) ............... 2006-254600

(51) Int. Cl.
*G06F 12/00* (2006.01)
(52) U.S. Cl. .................. 711/112; 711/100; 711/154
(58) Field of Classification Search ............... 711/100, 711/112, 147, 154, 163, 166
See application file for complete search history.

(56) References Cited

U.S. PATENT DOCUMENTS 7,065,615 B2 6/2006 Sugino et al.

| 2002/0129122 | A1 | 9/2002 | Kishimoto et al. |
| 2004/0078583 | A1 | 4/2004 | Kishimoto et al. |
| 2005/0108245 | A1 | 5/2005 | Kishimoto et al. |
| 2005/0286382 | A1 * | 12/2005 | Okamoto ............ 369/59.1 |

FOREIGN PATENT DOCUMENTS

| JP | 2002-268825 | 9/2002 |
| JP | 2004-139371 | 5/2004 |
| JP | 2005-196673 | 7/2005 |
| JP | 2005-149336 | 9/2005 |
| JP | 2006-185386 | 7/2006 |

* cited by examiner

*Primary Examiner*—Jasmine Song
(74) *Attorney, Agent, or Firm*—Antonelli, Terry, Stout & Kraus, LLP

(57) ABSTRACT

The present invention is a storage apparatus including a disk device having a storage medium for storing data, a controller unit configured to control the disk device, a setting unit configured to accept a setting operation for the disk device performed by a user and configure the setting according to the setting operation, a log information collection unit for collecting, as log information, the setting operation accepted by the setting unit, and a log information analysis unit for performing predetermined analysis processing on the setting operation based on the log information collected by the log information collection unit. The storage apparatus prevents unauthenticated operations by collecting and analyzing the log information about the setting operations, and achieves secure and smooth management.

14 Claims, 19 Drawing Sheets

FIG.8

LOGIN LOG INFORMATION

| ID | LOGIN DATE | TIME | TIME ZONE | FUNCTION | IP ADDRESS | RESULT | LOGIN MEANS | ADDITIONAL INFORMATION |
|---|---|---|---|---|---|---|---|---|
| 0000 | 06/07/20 | 16:59:00:000 | GMT | Login | 126:255:255:0 | Normal | Web | - |
| 0000 | 06/07/20 | 17:00:00:000 | GMT | Modify | 126:255:255:0 | Normal | Web | - |
| 0001 | 06/07/20 | 17:11:00:000 | GMT | Login | 126:255:255:1 | Normal | SVP | - |
| 0001 | 06/07/20 | 17:12:00:000 | GMT | Modify | 126:255:255:1 | Error | SVP | Anyone has Modify |
| 0000 | 06/07/20 | 17:20:00:000 | GMT | Logout | 126:255:255:0 | Normal | Web | - |

FIG.9

SETTING LOG INFORMATION

| ID | MODIFICATION DATE | MODIFICATION TIME | TIME ZONE | FUNCTION | OPERATION | RESULT | LOGIN MEANS | ADDITIONAL INFORMATION |
|---|---|---|---|---|---|---|---|---|
| 0000 | 06/07020 | 17:02:00:000 | GMT | Port | Add Port | Normal | Web | 00:00 |
| 0000 | 06/07/20 | 17:05:00:000 | GMT | Port | Add Port | Normal | Web | 01:00 |
| 0000 | 06/07/20 | 17:10:00:000 | GMT | Port | Add Port | Normal | Web | 02:00 |

FIG.10

LOG INFORMATION

| ID | LOGIN DATE | TIME | TIME ZONE | FUNCTION | IP ADDRESS | RESULT | LOGIN MEANS | ADDITIONAL INFORMATION |
|---|---|---|---|---|---|---|---|---|
| 0000 | 06/07/20 | 16:59:00:000 | GMT | Login | 126:255:255:0 | Normal | Web | - |
| 0000 | 06/07/20 | 17:00:00:000 | GMT | Modify | 126:255:255:0 | Normal | Web | - |
| 0000 | 06/07/20 | 17:02:00:000 | GMT | Port | Add Port | Normal | Web | 00:00 |
| 0000 | 06/07/20 | 17:05:00:000 | GMT | Port | Add Port | Normal | Web | 01:00 |
| 0000 | 06/07/20 | 17:10:00:000 | GMT | Port | Add Port | Normal | Web | 02:00 |
| 0001 | 06/07/20 | 17:11:00:000 | GMT | Login | 126:255:255:1 | Normal | SVP | - |
| 0001 | 06/07/20 | 17:12:00:000 | GMT | Modify | 126:255:255:1 | Error | SVP | Anyone has Modify |
| 0000 | 06/07/20 | 17:20:00:000 | GMT | Logout | 126:255:255:0 | Normal | Web | - |

FIG.11

ORDERED LOG INFORMATION

| ID | STARTING DATE | STARTING TIME | END DATE | END TIME | TIME ZONE | FUNCTION | LOGIN MEANS | ADDITIONAL INFORMATION |
|---|---|---|---|---|---|---|---|---|
| 0000 | 06/07/20 | 16:59:00:000 | - | - | GMT | Login | Web | - |
| 0000 | 06/07/20 | 17:00:00:000 | - | - | GMT | Modify | Web | - |
| 0000 | 06/07/20 | 17:02:00:000 | 06/07/20 | 17:10:00:000 | GMT | Port | Web | - |
| 0000 | 06/07/20 | 17:20:00:000 | - | - | GMT | Logout | Web | - |

FIG.12

SETTING INFORMATION

| ID | MODIFICATION DATE | MODIFICATION TIME | TIME ZONE | FUNCTION | OPERATION | SETTING MEANS | ADDITIONAL INFORMATION |
|---|---|---|---|---|---|---|---|
| 0000 | 06/07020 | 17:02:00:000 | GMT | Port | Add Port | Web | 00:00 |

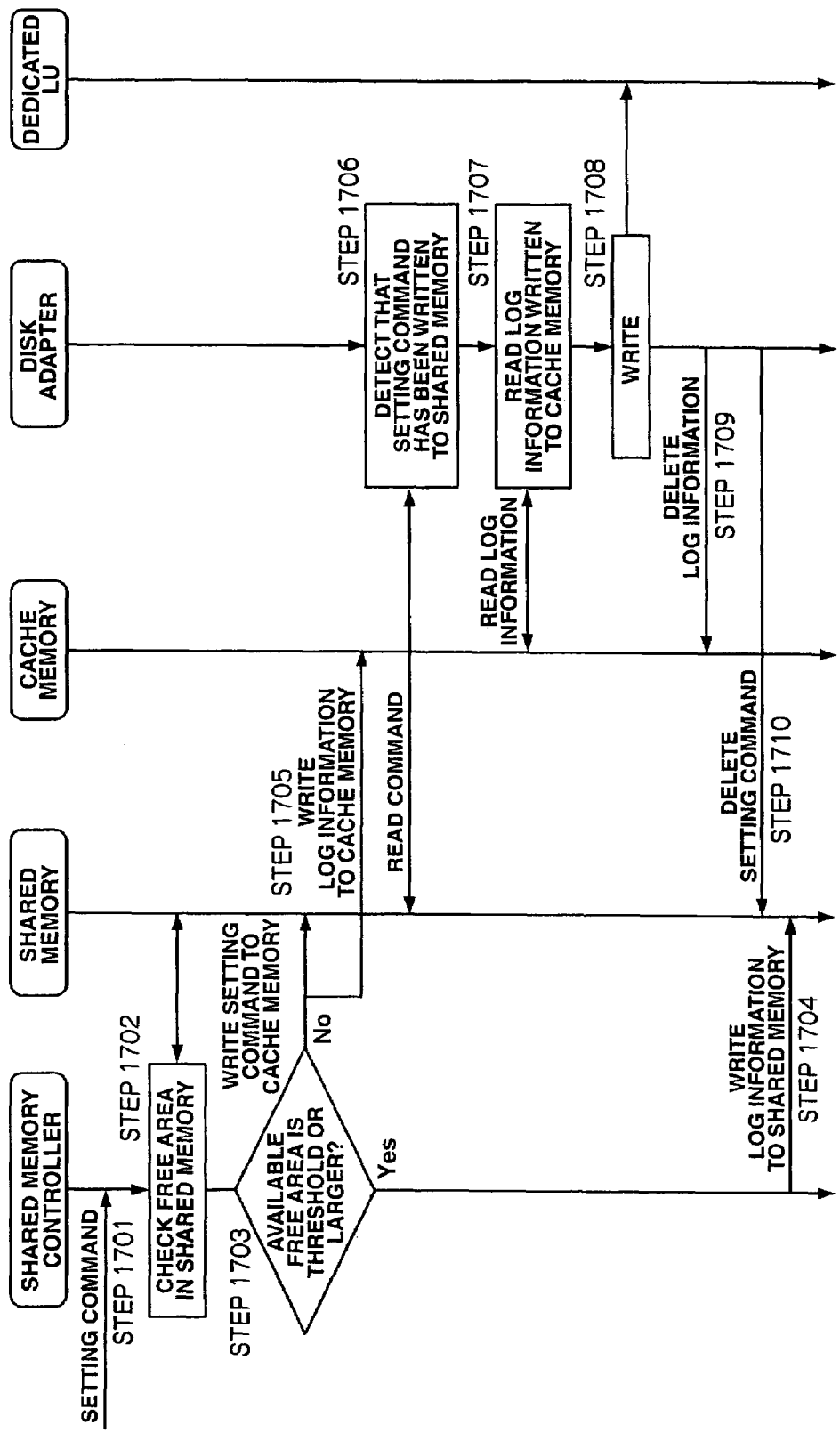

STORAGE APPARATUS AND SETTING METHOD FOR THE SAME

CROSS-REFERENCE TO RELATED APPLICATIONS

This application relates to and claims priority from Japanese Patent Application No. 2006-254600, filed on Sep. 20, 2006, the entire disclosure of which is incorporated herein by reference.

BACKGROUND

1. Field of the Invention

The present invention relates generally to a storage apparatus and a setting/management method for the storage apparatus, and particularly to a storage apparatus management technique using setting/modification log information for a storage apparatus.

2. Description of Related Art

In recent years, the need for security management for computer systems has become obvious. Accordingly, in current computer system management, information about setting/modification operations for a system configuration is collected and stored as operation history information (log information) so that a system administrator can browse and manage such log information.

JP-A-2006-185386 (Patent Document 1) discloses a storage system that can collectively manage the above described log information Patent Document 1 proposes a technique of collectively managing log information relating to modification in a storage system configuration that can divide up a storage area and manage the resulting divided storage areas.

In order to securely and smoothly manage a storage system, all operation logs relating to setting/modification of the system configuration have to be collected. Although mere monitoring or audit of the system conditions has conventionally been conducted by collecting all operation logs relating to setting/modification of the system configuration and using the logs, no techniques for utilizing those logs more effectively have been proposed.

Moreover, because of the higher need for information security for computer systems, higher-level security is also required for storage systems. The conventional security technique in which user access is authenticated by using a user ID and password can exclude unauthorized access to the system. However, once authenticated, the authenticated user can freely operate the system. Accordingly, even if an unauthenticated or inappropriate operation takes place, such operation cannot be restricted. A technique of restricting access to important files or similar by setting an access level for each user is also well known, but the technique cannot restrict user's behavior from a perspective of setting/modification operations.

Furthermore, because of advanced functions in the current storage systems, the storage system is becoming complicated in configuration and larger in capacity. Therefore, a system administrator has to set a huge number of complicated items when modifying the system configuration, and thus the setting operations require a long time and much trouble.

Furthermore, the complicated configuration and large volume in storage systems lead to an increase in the number of setting items and operation targets, and in management information that is to be collected and stored, such as operation log information, performance log information, and failure information. Therefore, it is becoming more and more difficult to understand the state of a storage system based on collected management information.

SUMMARY

According to an aspect of the invention, the invention is a storage apparatus including a disk device having a recording medium for storing data, a controller unit configured to control the disk device, a setting unit configured to accept a setting operation performed by a user for the disk device and configure settings in response to the setting operation, a log information collection unit configured to collect, as log information, the setting operation accepted by the setting unit, and a log information analysis unit configured to perform predetermined processing for analyzing the setting operation based on the log information collected by the log information collection unit.

The storage apparatus may include a log information storage unit configured to store the log information collected by the log information collection unit.

The log information analysis unit preferably performs the predetermined analysis processing based on the log information stored in the log information storage unit.

According to an aspect of the invention, the invention is a setting method for a storage system including a disk device having a recording medium for storing data and a controller unit configured to control the disk device. The setting method according to the invention includes accepting a setting operation for the disk device performed by a user, collecting the accepted setting operation as log information, and executing predetermined processing for analyzing the setting operation based on the collected log information.

According to the invention, log information relating to the setting/modification operations of each system administrator is collected and analyzed. Accordingly, it can easily be understood when and with what kind of means a system administrator has modified settings in which resource in the storage system. Moreover, unauthorized or inappropriate operations, such as unintended delete or modification of setting items by a system administrator can be prevented.

Moreover, according to the invention, log information for each system administrator is collected and analyzed. Therefore, the storage system can provide optimized navigation to each system administrator by predicting the subsequently performed operation. Accordingly, the burden on system administrators during setting operations can be reduced.

Furthermore, according to the invention, the log information about each administrator is collected, analyzed, organized in chronological order, and after the the log information is provided to the administrator. Accordingly, the state of the storage system, which varies hours to hour, can easily be understood.

Other aspects and advantages of the invention will be apparent from the following description and the appended claims.

BRIEF DESCRIPTION OF THE DRAWINGS

FIG. 8 shows an example of login information stored in a management apparatus according to an embodiment of the invention.

FIG. 9 shows an example of setting log information stored in a management apparatus according to an embodiment of the invention.

FIG. 10 shows an example of log information stored in a management apparatus according to an embodiment of the invention.

FIG. 11 shows an example of extracted and classified log information according to an embodiment of the invention.

FIG. 12 shows an example of simplified log information according to an embodiment of the invention.

FIG. 17 is a sequence chart illustrating processing in a log information management module in a management apparatus according to an embodiment of the invention.

DETAILED DESCRIPTION OF PREFERRED EMBODIMENTS

The invention is described with reference to exemplary embodiments illustrated in the attached drawing and made in accordance with a corresponding method of the invention.

Figure 1A:
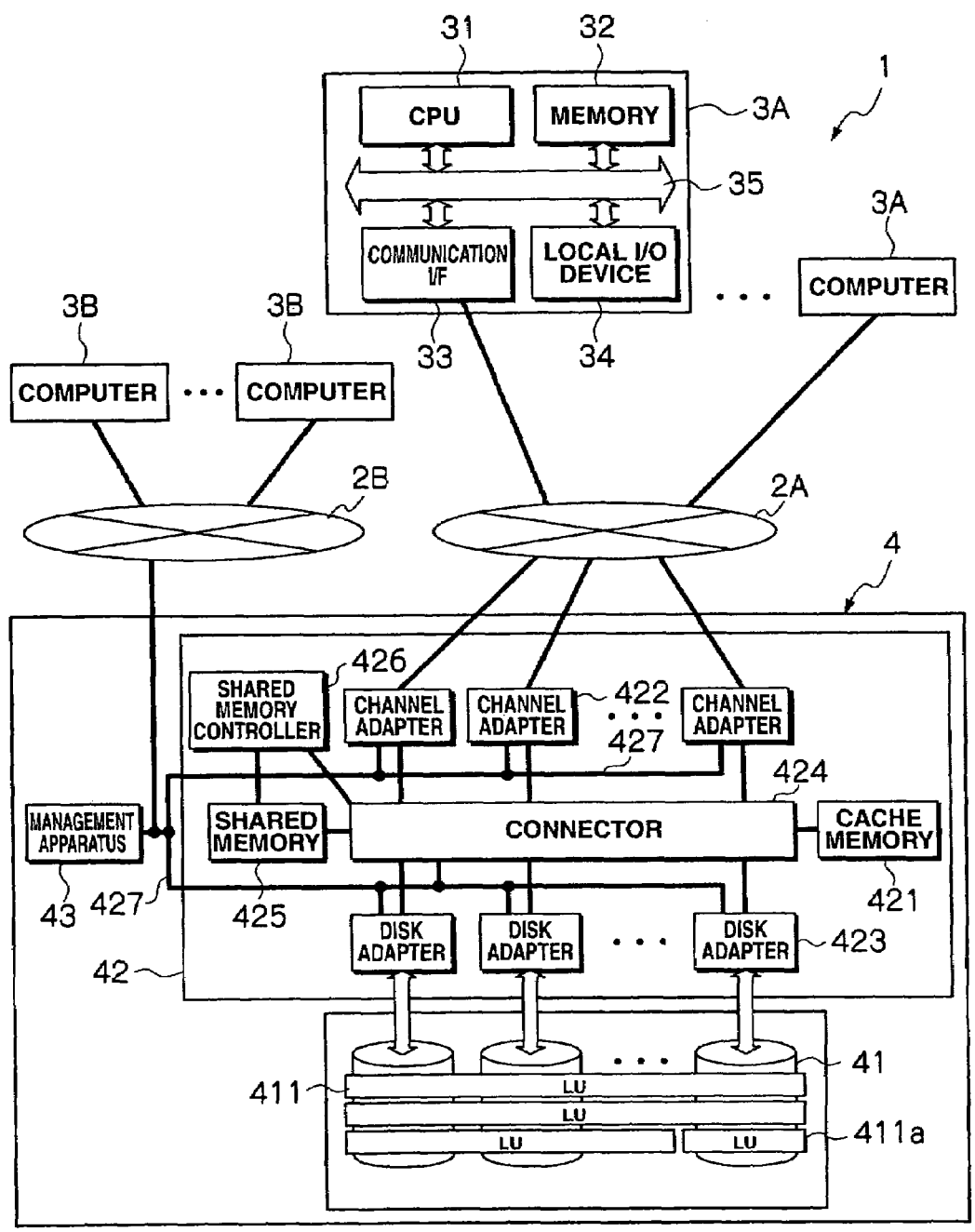
FIG. 1A is a schematic diagram showing a storage system according to an embodiment of the invention.

FIG. 1A is a diagram showing a configuration of a storage system 1 according to an embodiment of the invention. As shown in FIG. 1A, the storage system 1 includes computers 3A and 3B operatively connected respectively via networks 2A and 2B, and a storage apparatus 4. The storage apparatus 4 stores data according to a write command received from the computer 3A, and reads stored data according to a read command and transmits the data to the computer 3A. The storage apparatus 4 also receives a setting command from either of the computers 3A or 3B and configures settings or modification in the system configuration information about the storage system 1.

Each network 2A and 2B may be a LAN, the Internet, a SAN (Storage Area Network), or a public line, etc. Although the networks 2A and 2B are shown as separate ones in FIG. 1A, they may be the same network. Communication between the computer 3A and the storage apparatus 4 via the network 2A and between the computer 3B and the storage apparatus 4 via the network 2B is performed respectively according to predetermined protocols. If the network 2A is a LAN or the Internet, communication is performed according to TCP/IP. If the network 2A is a SAN, Fibre Channel Protocol is employed.

Alternatively, the computers 3A and 3B may be connected directly to the storage apparatus 4 via a dedicated line, not via a network. In that case, various protocols, such as FICON® (Fibre Connection), ESCON® (Enterprise System Connection), ACONARC® (Advanced Connection Architecture), FIBARC® (Fibre Connection Architecture), etc., can be used.

In this embodiment, the network 2A is a SAN, and thus communication is performed according to Fibre Channel-Protocol. The network 2B is a LAN, and thus communication is performed according to TCP/IP.

Each computer 3A and 3B typically is a versatile personal computer, workstation, or mainframe computer, etc. For example, the computer 3A is a host apparatus in a bank management system, or an aircraft seat reservation service system, or similar. The computer 3B is used mainly as a management terminal device for maintaining and managing the storage apparatus 4. The computers 3A and 3B may belong respectively to different users, and different service systems may be operated on each computer. For example, a user A may possess a group of the computers 3A and 3B, and a user B may posses another group of the computers 3A and 3B. A system administrator who manages the entire storage system 1 may possess one of the computers 3B.

The computers 3A and 3B include hardware resources such as a CPU 31, main memory 32, an interface unit 33, and a local I/O device 34, and those components are mutually connected via an internal bus 35. FIG. 1A shows the internal configuration of representative one of the computers 3A and 3B;

Each of the computers 3A and 3B also includes software resources such as device drivers, an operating system (OS), and application programs. The computers 3A and 3B execute, under control of the CPU 31, various programs in cooperation with the hardware resource, and thus achieve desired processing. For example, the computer 3A achieves the above mentioned information processing service by executing an business specific application program on the OS under the control of the CPU 31. Meanwhile, the computer 3B provides various management functions to a system administrator by executing a storage operation program on an OS under the control of the CPU 31.

The computer 3A not only operates the service system, but may also have a storage management program and manages the storage apparatus 4. The computer 3A manages the storage apparatus 4 via the network 2A by executing the storage management program.

The storage apparatus 4 includes one or more disk devices 41, a controller unit 42 configured to control write/read access to/from the disk devices 41, and a management apparatus 43 that manages the storage apparatus 4. Each disk device 41 and the controller unit 42 may be directly connected via an internal bus, or connected via an external bus. The management apparatus 43 is connected to the network 2B and a predetermined module provided in the controller unit 42.

The disk devices 41 may form RAID (Redundant Arrays of Inexpensive Disks). Storage areas provided by the disk device 41 are defined as one or more logical volumes (LU) 411 by using a peculiar identifier (LUN: Logical Unit Number). An LUN, being an identifier, is allocated to each volume 411. Access to the volume 411 is made by blocks, each block being a predetermined size. A logical block address (LBA) is allocated to each block. Therefore, the computer 3A can access a block in a predetermined volume by specifying the logical address consisting of the LUN and the LBA to the controller unit 42. The above described information relating to the volume 411 is maintained as system configuration information in the controller unit 42.

The controller unit 42 is a system circuit that comprehensively controls I/O processing between the computer 3A and the disk device 41. More specifically, the controller unit 42 includes a cache memory 421, channel adapters 422, and disk adapters 423, and those modules are mutually connected via a connector 424, such as a cross bar switch. The controller unit 42 has a shared memory 427 and a shared memory controller 426, and those modules are also connected to the connector 424. Those modules may be either physically independent or integral modules.

The cache memory 421 is used mainly for temporarily storing a command and/or I/O data exchanged between the computer 3A and the disk device 41. For example, a command sent from the computer 3A is temporarily stored in the cache memory 421, and data read from the disk device 41 is temporarily held in the cache memory 421 when being sent to the computer 3A.

Figure 1B:
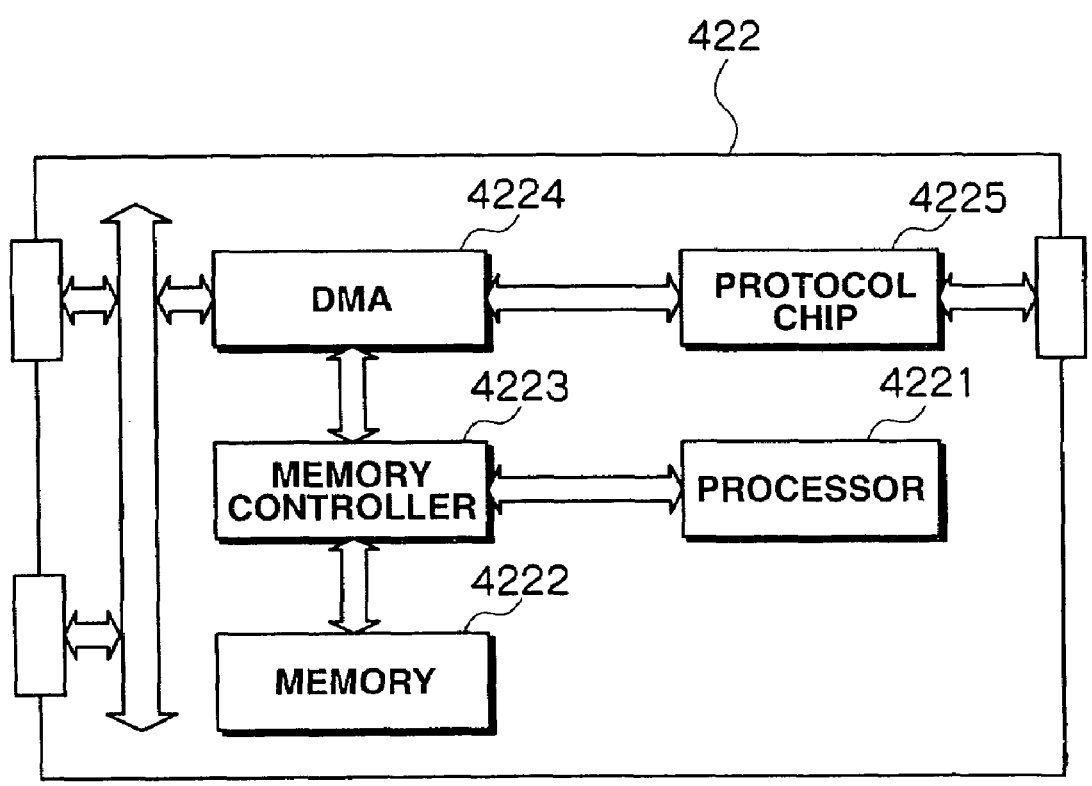
FIG. 1B is a schematic diagram showing a channel adapter according to an embodiment of the invention.

Referring to FIG. 1B, the channel adapter 422 is a system circuit including a microprocessor 4221, a memory 4222, a memory controller 4223, a DMA 4224, and a protocol chip 4225, and the channel adapter 422 provides a port for connection with the network 2A. A network address is allocated to the port in the channel adapter 422. Therefore, each channel adapter 422 is identified in the network system 2A and can function as NAS (Network Attached Storage). The channel adapter 422 transmits/receives commands concerning data access or commands concerning management to/from the computer 3A connected via the network 2A.

The channel adapter 422 is also connected to the management apparatus 43 via an internal communication line 427 so that the channel adapter 422 can accept predetermined processing from the management apparatus 43. For example, the system administrator can install, in the memory 4222 in the channel adapter 422, a microprogram, or similar, executed by the processor 4221 in the channel adapter 422. The channel adapter 422 may also communicate with the management apparatus 43 via the connector 424, without being connected to the management apparatus 43.

Figure 1C:
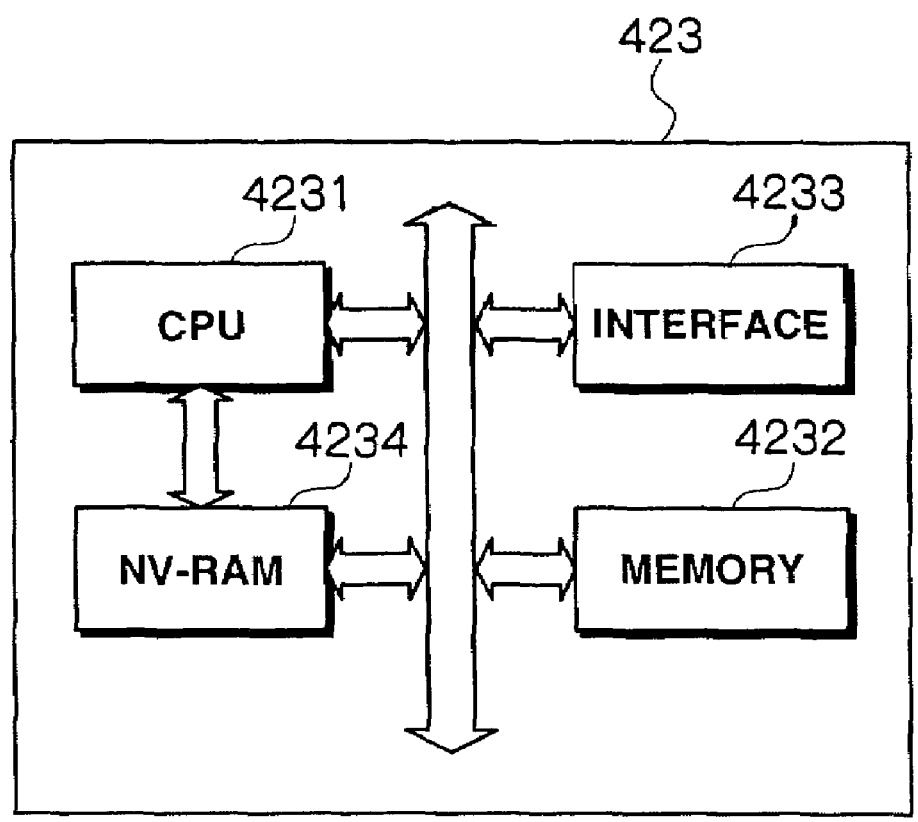
FIG. 1C is a schematic diagram showing a disk adapter according to an embodiment of the invention.

As shown in FIG. 1C, the disk adapter 423 is also a system circuit including a microprocessor 4231, memory 4232, and communication interface 4233, and functions as an I/O interface that controls the communication protocol with the disk device 41. The disk adapter 4234 may also have a nonvolatile memory 4234. The disk adapter 423 is connected, for example, to a corresponding disk device 41 via the Fibre Channel cable, and exchanges data with the disk device according to. Fibre Channel Protocol.

As described above, the connector 424 is a cross bar switch, or similar. The connector 424 arbitrates an input data signal, switches paths for the data signal, and establishes a path between a transmission source module and a transmission destination module. The connector 424 is also connected to the management apparatus 43 via the internal communication line 427. Meanwhile, the disk adapter 424 does not have to necessarily be directly connected to the management terminal 43, and may also communicate with the management apparatus 43 via the connector 424.

The shared memory 425 is used by the channel adapter 422 and the disk adapter 423, and stores various control information, commands, and log information, or similar. The log information is information about the operation history for the storage apparatus 4. The shared memory 425 is controlled by the shared memory controller 426.

Figure 2:
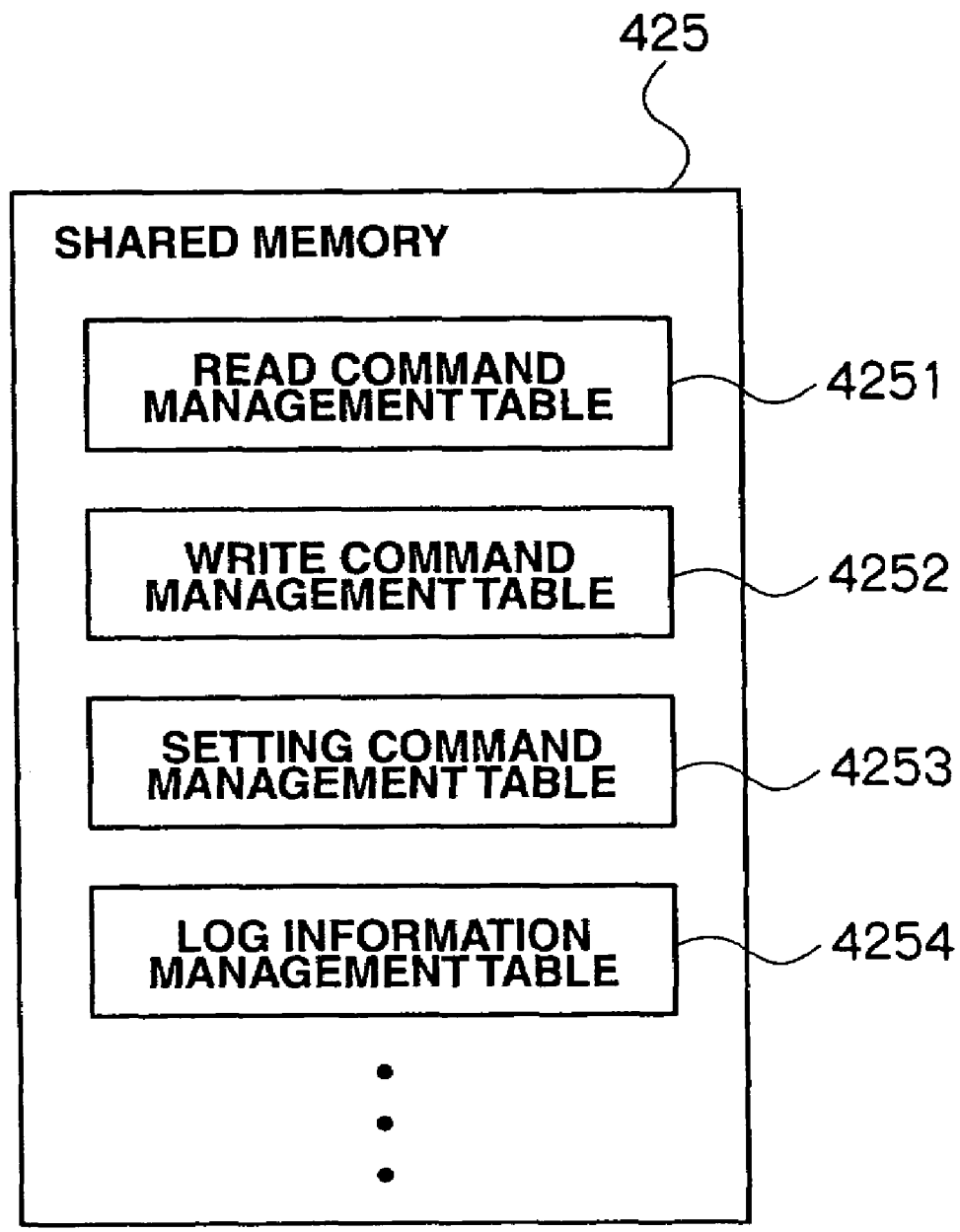
FIG. 2 is a schematic diagram showing an example of contents of a shared memory in the storage apparatus according to an embodiment of the invention.

FIG. 2 shows an example of contents of the shared memory 425 disposed in the storage apparatus 4 according to an embodiment of the invention. As shown in FIG. 2, the shared memory 425 stores, among other things, a read command management table 4251, write command management table 4252, setting command management table 4253, and log information management table 4254. The log information management table 4254 includes, for example, operation log information, performance log information, and failure log information. A storage area having a predetermined volume in the shared memory 425 is allocated to each management table 4251 to 4254.

The storage apparatus 4 has a logical volume 411a dedicated to storing information that could not be stored in the shared memory 425 (FIG. 1). The shared memory controller 426 monitors whether or not the storage capacity in use in the shared memory 425 exceeds a predetermined storage capacity. For example, if a write command is received but the available memory capacity in the shared memory 425 is lacking, the shared memory controller 426 writes the write command to the write command management table 4251, and writes write data associated with the write command to the cache memory 421. The disk adapter 424 monitors the shared memory 425. If the disk adapter 425 detects that a write command has been written to the shared memory 425, the relevant data is read from the cache memory 421 and written to the disk device 41.

In some cases, data write to the dedicated logical volume 411a is performed for only a certain type of write command. The write command written to the shared memory 425 contains a writable/unwritable flag indicating whether or not data can be written to the dedicated logical volume 411a. If the flag indicates "unwritable," the data is written to the shared memory 425. For example, the write command to the dedicated logical volume 411a is forbidden to be written to the dedicated logical volume 411a, and is written only to the shared memory 425.

The data stored in the dedicated logical volume 411a is read and stored in the shared memory 425 when an available storage area is ensured in the shared memory 425. If an available area is ensured in the shared memory 425, the shared memory controller 426 checks whether or not there are any commands that have been written to the dedicated logical volume 411a. If any command exists, the shared memory controller 426 writes a read command to the read command management table 4252 in the shared memory 425. If the disk adapter 423, which always monitors the shared memory 425, detects that a read command has been written to the shared memory 425, the disk adapter 423 reads the data that is the read target, writes that data to the cache memory 421, and writes the result to the read command management table 4252. Subsequently, the shared memory controller 425, after detecting that the read target data has been written to the cache memory 421, reads the data from the cache memory 421 and stores it in the shared memory 425.

Data read/write processing from the channel adapter 422 to the disk adapter 423 may be performed indirectly via the shared memory 425 as described above, or may be performed directly without involving the shared memory 425.

Alternatively, the channel adapter 422 may function as the disk adapter and control data I/O.

Although in this embodiment the cache memory 421 and the shared memory 425 are provided independently from the channel adapter and the disk adapter 423, the embodiment is not limited to that form. The cache memory 421 and/or the shared memory 425 may be separately provided to each channel adapter 422 and each disk adapter 423. In that case, the connector 424 mutually connects the channel controller 110 and the disk controller 140 having the separately provided cache memory 421 and/or the shared memory 425.

If a setting command is received from the computer 3A, settings are configured while the controller unit 42 selects one of the channel adapters 442 and the disk adapters 423 according to the setting command. More specifically, a system administrator can configure settings for the system configuration of the disk devices 41, settings for communication paths between the computer 3A and the disk adapter 422, and install an OS or microprogram executed by the channel adapter 422 or the disk adapter 423 an exemplary system configuration settings for the disk device 41 include definition/modification of logical volume, expansion or removal of the disk device 41, and RAID format change (e.g. change from RAID 1 to RAID 5). The system administrator can also check the operation state and specify a malfunctioning section in the storage apparatus 4. A system administrator may also set a target to monitor for failures, the kinds of failures to monitor for, and a relevant notification destination in case of failure.

The management apparatus 43 is a computer for maintaining and managing the storage apparatus 4. The management apparatus 43 may be a dedicated computer for maintaining and managing the storage apparatus 4, or may be configured as a service processor (SVP), which is a versatile computer having a maintenance/management function. The management apparatus 43 provides a system administrator with a user interface for various operations necessary for maintenance and management. Alternatively, the management apparatus 43 may have a server function with which a system administrator operates the management apparatus 43 from a user interface on the computer 3B. For example, a web client program is installed on the computer 3B, a web server program is installed on the management apparatus 43, and the system administrator operates the management apparatus 43 from the computer 3B. With this configuration, the system administrator can configure the above described settings for the system configuration of the disk devices 41 or communication paths between the computer 3A and the channel adapter 422, and install an OS or microprogram executed by the channel adapter 422 or the disk adapter 423.

Although in FIG. 1 the management apparatus 43 is built as part of the storage apparatus 4, it may be provided external to the storage apparatus 4. Alternatively, it may be built as part of the controller unit. 42.

Figure 3:
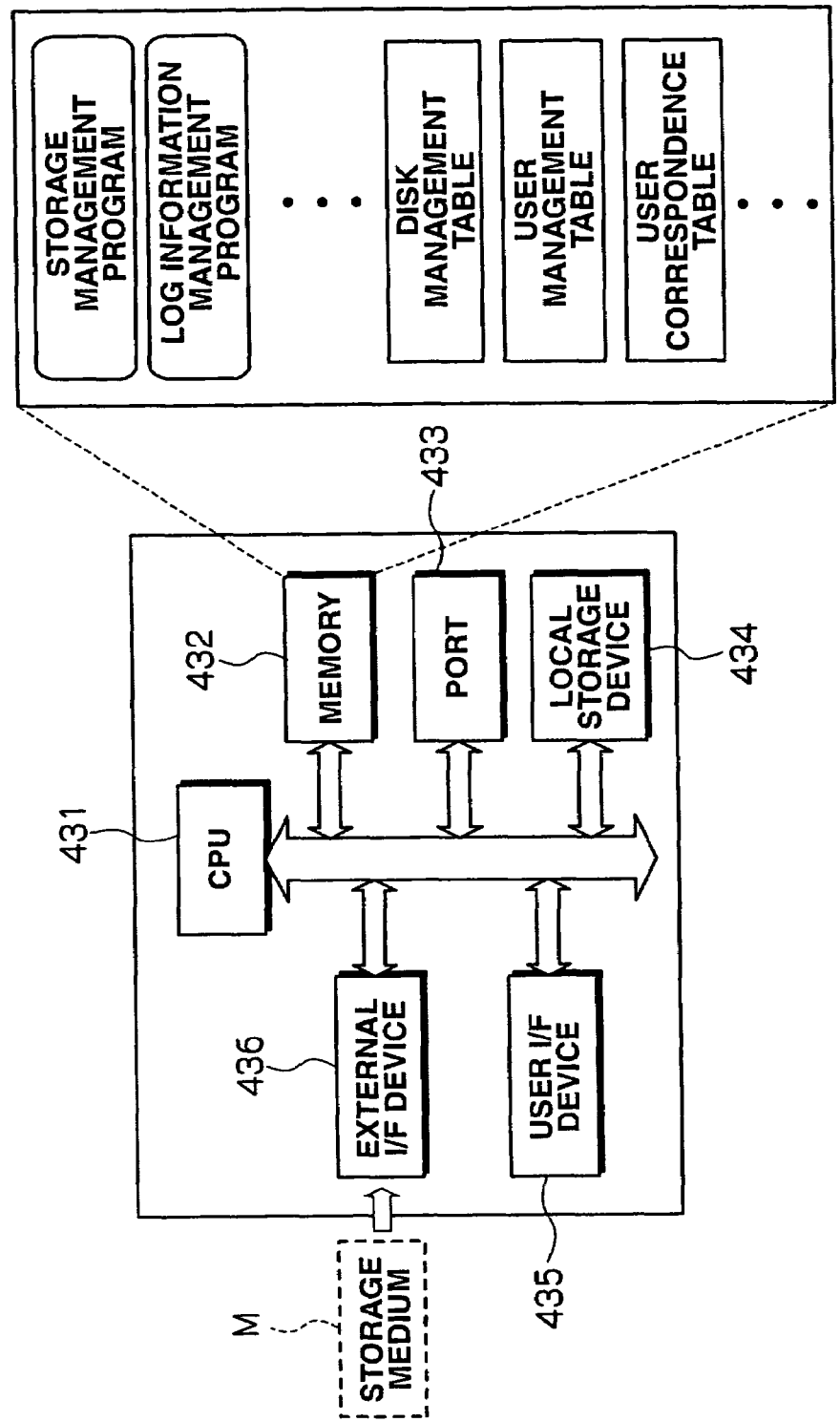
FIG. 3 is a schematic diagram showing a management apparatus according to an embodiment of the invention.

FIG. 3 is a diagram showing a configuration of the management apparatus 43 according to an embodiment of the present invention. Referring to FIG. 3, the management apparatus 43 is a computer having a CPU 431, memory 432, port 433, local storage device 434, user I/F device 435, and external I/F 436.

The CPU 431 governs control of the overall management apparatus 43. The memory 432 functions as main memory of the CPU 431, and stores various management programs and management tables so that the CPU 431 can use them. In this embodiment, the memory 432 stores, for example, a storage management program, a log information management program, a disk management table, a user management table, and a user correspondence,table. The storage management program is a program that enables maintaining and managing the storage apparatus. The user management table contains a user ID, a user name, and a password, etc, for a system administrator as a user. The storage management program may have the above-mentioned web server function. Those management programs and management tables are read from the local storage device 434 and maintained on the memory 432 under the control of the CPU 431 when power is turned on.

The port 433 is a communication port for connection with the internal communication line 427 in the control unit 42. The management apparatus 43 communicates with the channel adapter 422 and the disk adapter 423 via the internal communication line 427 connected to the port 433 to execute processing relating to the above described settings. The internal communication line 427 is also connected to the connector 424, and the management apparatus 43 can access, via the port 433, the shared memory 425 and the cache memory 421 in the control unit 42. The port 433 is also an external communication port for connection with the network 2B. The management apparatus 43 and the computer 3B communicate with each other via the port 433.

The user I/F device 435 is a user interface for a system administrator. The user I/F device 435 is, for example, a keyboard and mouse that mainly function as input devices, and a display and printer that mainly function as output devices.

The external I/F device 436 is a device for accessing the programs and data stored in a storage medium M. The programs and data read via the external I/F device are stored in the memory 432 and/or the local storage device 434. The storage management program is, for example, read from the storage medium M and transferred to the local storage device 168.

Figure 4:
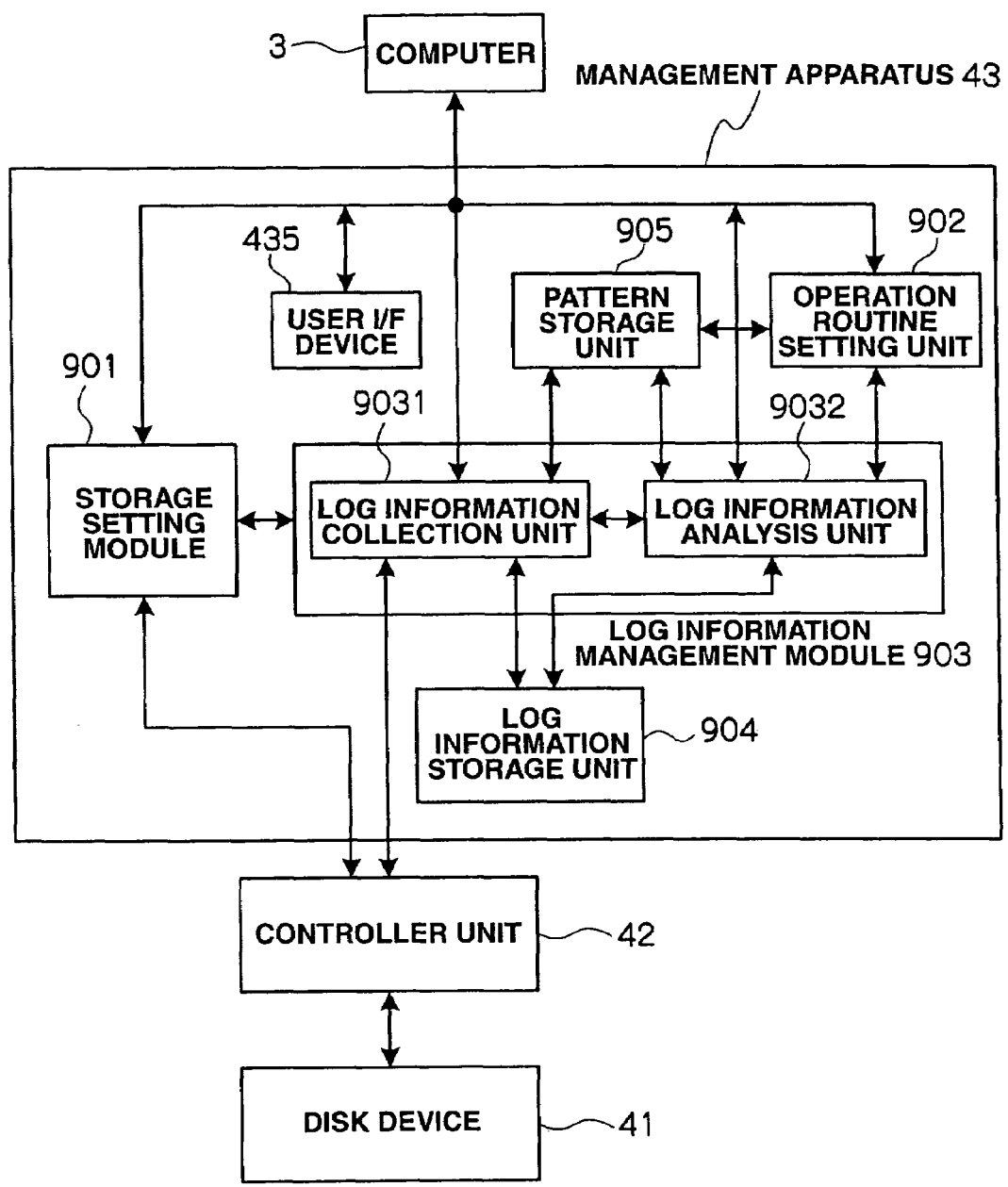
FIG. 4 is a block diagram illustrating a log information collection/analysis function in a storage system according to an embodiment of the invention.
Figure 5A:
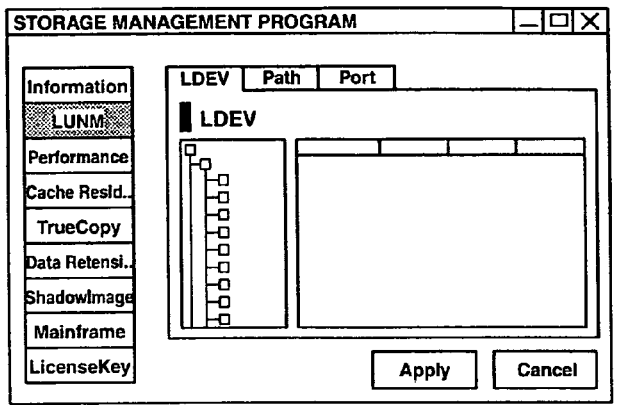
FIGS. 5A-5D show transition screenshots according to an operation navigation pattern in the storage system according to an embodiment of the invention.
Figure 5B:
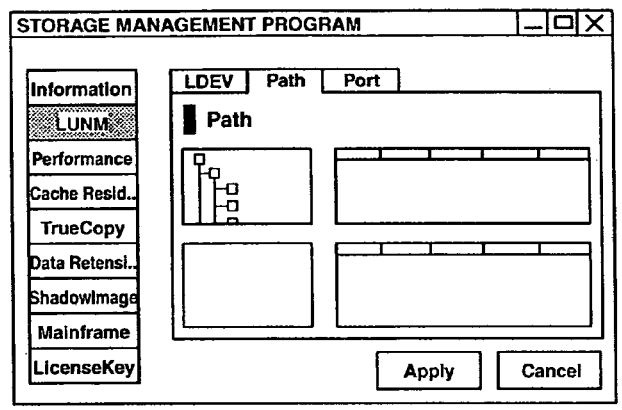
Figure 5C:
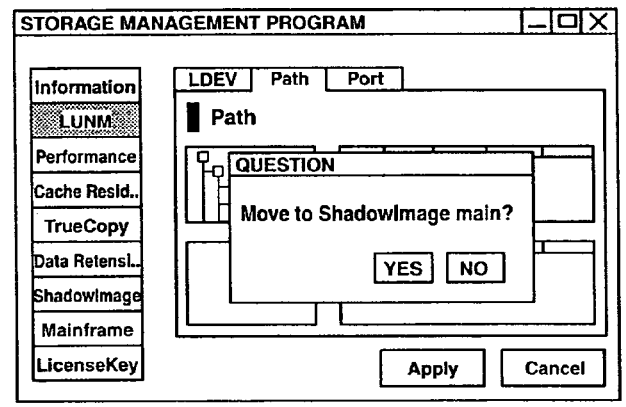
Figure 5D:
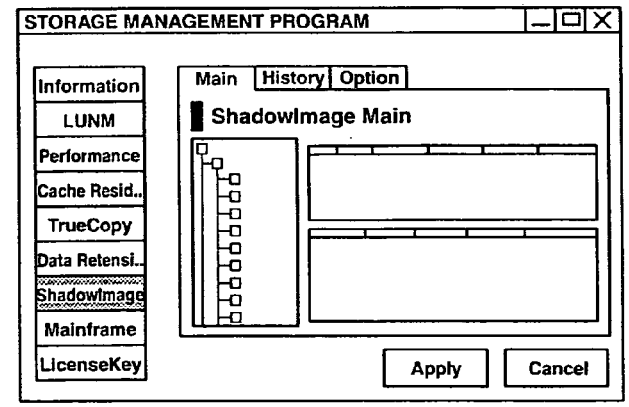

FIG. 4 is a block diagram illustrating the log information collection/analysis function in the storage system 1 according to an embodiment of the present invention. More specifically, the log information collection/analysis function is achieved by the storage management program and the log information management program executed in the management apparatus 43 cooperating with various hardware resources. A system administrator may operate the management apparatus 43 by using the user I/F device 435 in the management apparatus 43, or may operate the management apparatus 43 from a user interface in the computer 3B. If the operation is performed from the computer 3B, the web system may be available. Alternatively, if a storage operation program is installed on the computer 3B, the management apparatus 43 may be operated remotely by using the storage operation program.

Referring to FIG. 4, the log information collection/analysis function in the management apparatus 43 is achieved by a storage setting module 901, an operation routine setting unit 902, a log information management module 903, a log information storage unit 904, and a pattern storage unit 905.

The storage setting module 901 displays a setting operation screen for the storage apparatus 4 on the user interface, accepts a system administrator's setting operation, and performs the setting operation to the controller unit 424 under the management of the log information management module 903. The user interface mentioned here may be the user I/F device 435 in the management apparatus 43, or may be the user interface in the computer 3B.

The operation routine setting unit 902 provides a user interface to system administrators, produces a set of routine work for each system administrator that configures settings, and stores the routine work set as a work pattern in the pattern storage unit 905. The work pattern contains, for example, the time when the setting operation was performed, the time period taken for that operation, the target on which the setting operation was performed, and content of the setting operation, etc. The operation routine setting unit 902 also produces an operation navigation pattern for a setting operation for each system administrator, and stores the pattern in the pattern storage unit 905. The operation navigation pattern contains, for example, the time the setting operation was performed, the time period taken for the operation, the target on which the setting operation was performed, and the content of the setting operation.

The log information management module 903 includes a log information collection unit 9031 and a log information analysis unit 9032. The log information collection unit 9031 collects setting operation a system administrator requests of the storage apparatus 45, and sends the collected setting operation as log information to the log information analysis unit 9032. The log information collection unit 9031 commands the storage setting module to perform processing for the requested setting operation according to the analysis result concerning whether or not the setting operation sent from the log information analysis unit 9032 is an unauthenticated operation. More specifically, if the analysis result does not indicate an unauthenticated operation, the log information collection unit 9031 commands the storage setting module to perform the requested setting operation and stores the relevant log information and the analysis result in the log information storage unit 904. The setting operation is, for example, performed to the disk adapter 423 in the controller unit 42, and the disk adapter performs setting/modification processing according to the setting operation in response to the command. Meanwhile, if the analysis result indicates an unauthenticated operation, the log information collection unit 9031 refuses to perform processing according to the requested setting operation, and stores the log information and the analysis result in the log information storage unit 904. The system administrator is notified that the setting operation is unauthenticated, and is accordingly refused.

The log information analysis unit 9032 determines whether or not the log information sent from the log information collection unit 9031 indicates an unauthenticated operation. The log information analysis unit 9032 sends the analysis result to the log information collection unit 9031. In a process of the determination, the log information analysis unit 9032 refers to a log information list that has already been stored in the log information storage unit 904. More specifically, the log information analysis unit 9032 searches, every time the log information is sent, the log information list stored in the log information storage unit 904 for the log information containing the same "setting operation function" and "additional information" as those contained in the sent log information, and acquires the ID of the relevant log information. If that ID does not coincide with the current system administrators ID, the log information analysis unit 9032 determines that the setting operation is unauthenticated. For example, if a system administrator is about to execute an order to delete system configuration information, the log information analysis unit 9032 searches for the system administrator who established settings for that system configuration information in the past. If the log information analysis unit 9032 determines that the system administrator who executed the delete command and the current system administrator who is about to perform the setting operation are not identical, the execution of the delete command is prevented, and accordingly the log information analysis unit 9032 determines that the operation is unauthenticated.

The log information analysis unit 9032 determines whether or not the work pattern of a system administrator who is about to perform a setting operation is unauthenticated by referring to the work patterns stored in the pattern storage unit 905. More specifically, the log information analysis unit 9032 acquires, every time the log information is sent, the work pattern of a system administrator who is about to perform a setting operation from the pattern storage unit 905. The log information analysis unit 9032 also produces, from the log information stored in the log information storage unit 904, a latest operation pattern based on the log information starting from the start of the current setting operation to the present. The log information analysis unit 9032 then compares the acquired work pattern and the latest pattern. If the latest operation pattern does not coincide with the past work pattern, the log information analysis unit 9032 determines that the current setting operation is unauthenticated, and then sends the analysis result indicating an unauthenticated setting operation to the log information collection unit 9031. For example, a system administrator's setting operation performed outside specified hours and/or to an operation target that has not been specified can be prevented. Moreover, an operation screen and operation procedure performed to a system administrator may also be restricted in advance by using the work patterns.

The log information analysis unit 9032 also refers to the log information stored in the log information storage unit 904 every time the log information is sent, and determines whether or not any logs for an operation target to which a system administrator is about to perform a setting operation exist. If no logs for the operation target to which the setting operation is about to be performed exist, the log information analysis unit 9032 regards that setting operation as being unauthenticated, and sends an analysis result indicating an unauthenticated setting operation to the log information collection unit 9031. By way of this, setting operations performed by a system administrator using a user interface that has never been used for setting operation can be restricted.

The log information analysis unit 9032 refers, every time the log information is sent, to the log information stored in the log information storage unit 904 and extracts the past operation patterns, and also specifies the latest operation pattern based on the setting operations starting from the start of the current setting operation to the present. The log information analysis unit 9032 searches the past operation patterns and determines whether or not the latest operation pattern is included. If the latest operation pattern is not included, the log information collection unit 9031 determines that the present setting operation is unauthenticated, and sends an analysis result indicating an unauthenticated setting operation to the log information collection unit 9031. By way of this, a system administrator's operation can be prevented if the operation procedure is different from those in the past.

The log information analysis unit 9032 predicts a setting operation that would be subsequently performed based on the system administrator's past log information and a series of the current setting operations. The log information analysis unit 9032 sends the subsequent setting operation prediction result to the user I/F device 435 for provision to the system administrator. If the system administrator is operating the computer 3B, the prediction result is sent to the computer 3B. The user I/F device 435 displays a confirmation message indicating whether or not the system administrator will operate according to the prediction result. If the system administrator enters a command corresponding to the prediction result in response to the confirmation message, the command is given to the log information collection unit 9031.

More specifically, the log information analysis unit 9032 compares the produced latest operation pattern and the above described navigation pattern. If the latest operation pattern fulfills predetermined conditions, the log information analysis unit 9032 performs the subsequent setting operation indicated by the operation navigation pattern to the system administrator. Thus, a screen that follows a predetermined setting operation procedure is provided to the system administrator, and accordingly the setting operations can be efficiently performed.

The log information analysis unit 9032 may also predict the subsequent setting operation by comparing the latest operation pattern produced and the above described operation navigation pattern. In other words, the log information analysis unit 9032 extracts, from the operation navigation patterns, a pattern having parameters, such as the operation time and the number of operations, for each operation target, the parameters that are the same as, or similar to, those of the latest operation pattern, and predicts the subsequent setting operation. Thus, after preparing an initial operation navigation pattern only, operation navigation patterns are learned and accumulated by subsequent setting operations performed by the system administrator, and an effective operation navigation can be provided.

FIGS. 5A through 5D show transition screenshots according to the operation navigation pattern in the storage system 1 according to an embodiment of the invention. The storage setting module 901 displays a setting operation screen for the storage apparatus 4 on the user I/F device 435 (FIG. 5(a)). A system administrator selects, for example, the "Apply" button in the setting operation screen in order to apply setting/modification, and selects the "Port" tab to switch the displayed content (FIG. 5(b)). In response to this, the log information collection unit 9031 sends that setting operation to the log information analysis unit 9032. The log information analysis unit 9032 recognizes that the system administrator has performed an "LDEV→Port" setting operation, predicts that the next setting operation screen will be a "Shadow Image Main" screen, and sends the prediction result to the log information collection unit 9031. The log information collection unit 9031, after receiving the prediction result, displays a confirmation message for confirming that the screen is switching to the next setting operation screen (FIG. 5(c)). If the system administrator selects "YES" in response to that confirmation message, the log information collection unit 9031 commands the storage setting module 901 to display the "Shadow Image Main" screen, which is the next setting operation screen (FIG. 5(d)).

The log information management module 903 also provides the log information stored in the log information storage unit 904 to the system administrator from various viewpoints. As described above, the log information includes operation log information, performance log information, and failure log information.

Figure 6:
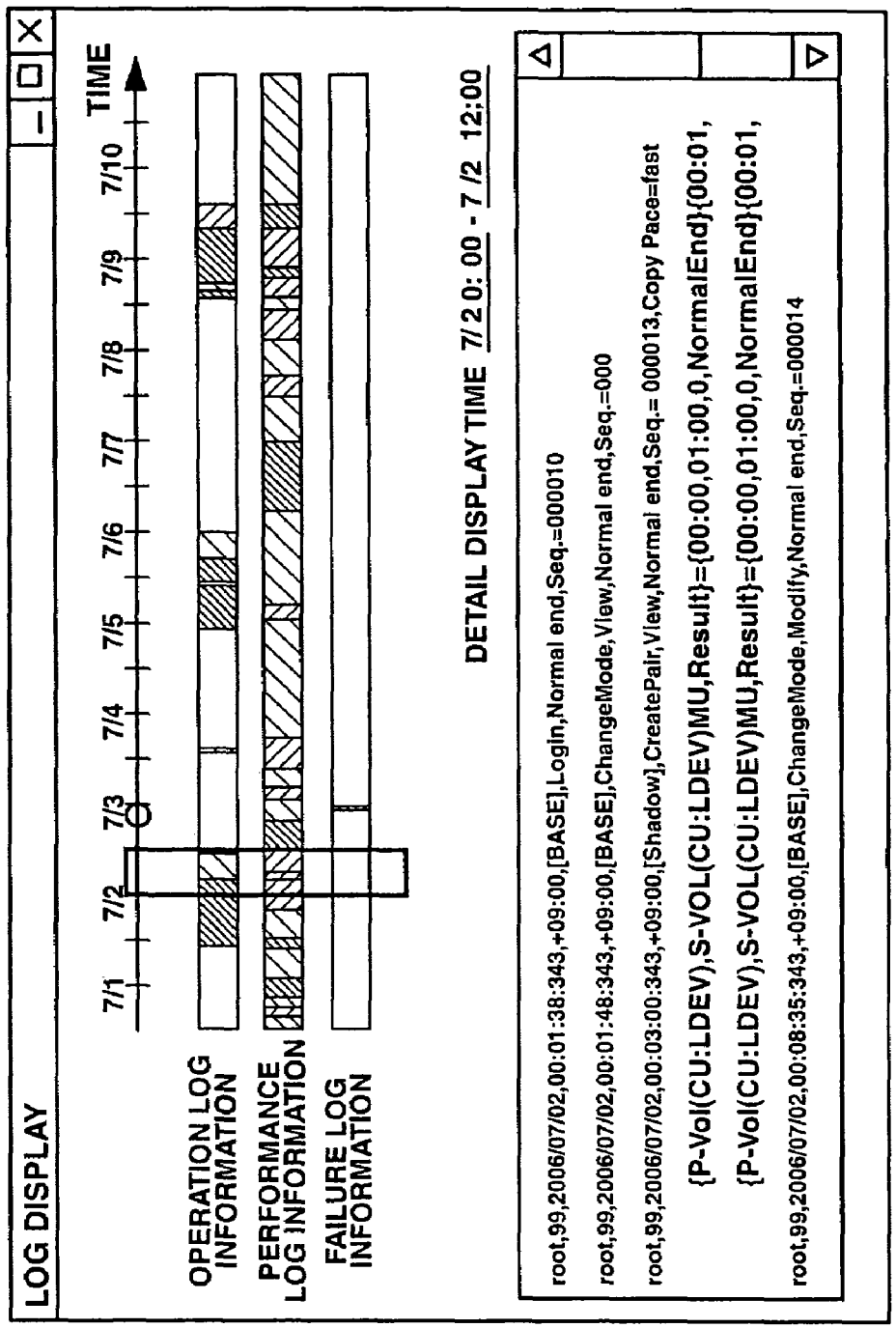
FIG. 6 shows a display example of log information provided by a log information management module according to an embodiment of the invention.

FIG. 6 shows a display example of the log information provided by the log information management module 903 according to an embodiment of the invention. As shown in FIG. 6, the log information management module 903 displays time-series graphs of the operation log information, performance log information, and failure log information so that each kind of information can be visually distinguished between. For example, the operation log information, performance log information, and the failure log information are shown with detail bars that are separated by colors for each operation target. A marker is attached to a portion indicating a setting operation having significant meaning. In FIG. 6, a marker is attached to the "7/3" point.

Figure 7:
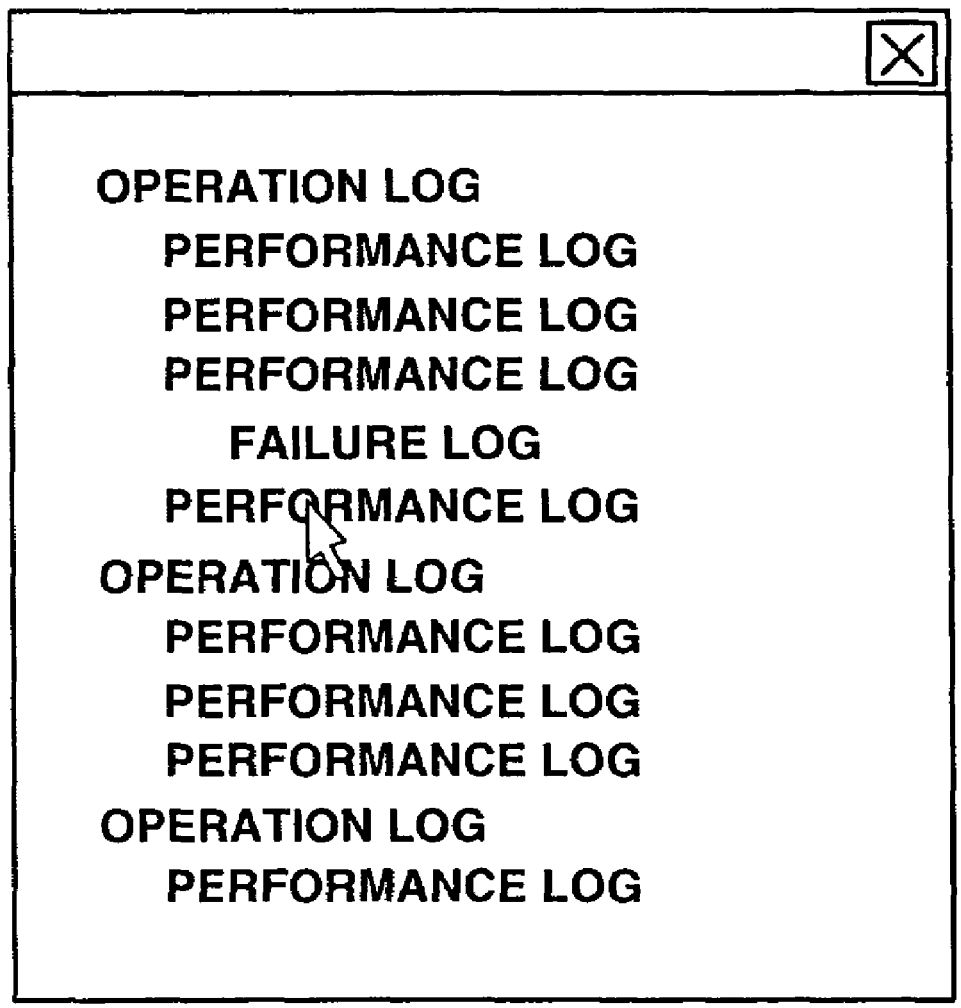
FIG. 7 shows a display example of log information provided by a log information management module according to an embodiment of the invention.

The log information management module 903 also accepts arbitrary selection of a time range for a detail bar. By a system administrator selecting an arbitrary time range of the detail bar, the log information management module 903 displays a frame indicating the selected range on the detail bar, and displays, within a detail log display area, a particular log concerning the log information in the selected range in time-series order. The log information management module 903 may display the log information by indenting each type of log information, as shown in FIG. 7.

If the system administrator performs setting operations for the system configuration of the storage apparatus 4 by using the management apparatus 43 directly or from the computer 3B, the system administrator has to login the management apparatus 43.

FIG. 8 shows an example of login information stored in the management apparatus 43 according to an embodiment of the present invention. The login information includes login information for all system administrators. As shown in FIG. 8, the login information contains "ID," "Login Date," "Time," "Time Zone," "Function," "IP Address," "Result," and "Login Means". The "ID" is an identification number for identifying a user (system administrator) who logged in. The "Login Date" is the date when a system administrator logged in last time, and the "Time" is the login time. The "Time Zone" is the time zone code to which a terminal (the management apparatus 43 or the computer 3A) a system administrator operates, belongs, e.g., Greenwich mean time. The "Function" indicates a status, such as "Login," "Logout," and "Modify." The "IP Address" is the IP address of the terminal from which a system administrator logged in. The "Result" shows whether or not the log information collection based on setting operation was completed. "Normal" indicates termination after normal setting operations, and "Error" indicates termination with an error after unauthenticated setting operations. "Login Means" shows the means with which a system administrator logged in to provide a setting operation. The login means may be the management terminal 43, a user interface provided by the storage operation program on the computer 3A, or a user interface provided by the web server function in the management apparatus 43 in the computer 3A.

FIG. 9 shows an example of setting log information stored in the management apparatus 43 according to an embodiment of the invention. As shown in FIG. 9, the setting log information contains "ID," "Modification Date," "Modification Time," "Time Zone," "Function," "Operation," "Result," and "Operation Means." The "Modification Date" is the date when the system configuration setting operation was performed, and the "Modification Time" is the time when the system configuration setting operation was performed. The "Function" indicates the content of the system configuration setting operation. The "Operation Means" indicates the means with which a system administrator performed the setting operations.

FIG. 10 shows an example of the log information stored in the management apparatus 43 according to an embodiment of the invention. The management apparatus 43 collects and stores the log information about all system administrators who log in to the management apparatus 43. The log information includes login information and a setting operation sequence performed for the storage setting module 901 collected by the log information collection unit 9031. The log information is stored in the log information storage unit 904.

The storage setting module 901 defines specific setting operation screens in response to the system configuration setting operations for the storage apparatus 4. The setting operations include settings for the system configuration of the disk device 41 and settings for communication paths between the computer 3A and the channel adapter. Typical system configuration settings for the disk device 41 include logical volume definition/modification, expansion or removal of the disk device 41, and RAID format change (e.g., change from RAID 1 to RAID 5). Check of the operation state in the storage apparatus 4, identification of a malfunctioning section, settings of a target to monitor for failures and the kinds of failures, and settings of notification target when a failure occurs are also included.

Figure 13A:
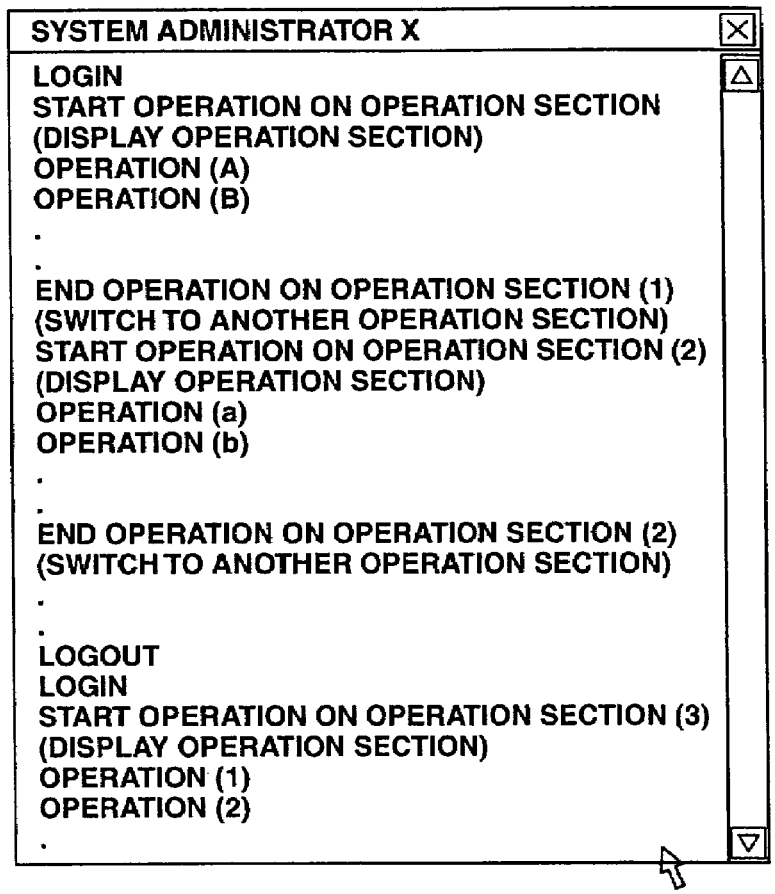
FIGS. 13A and 13B show an example of extracted and classified log information according to an embodiment of the invention.
Figure 13B:
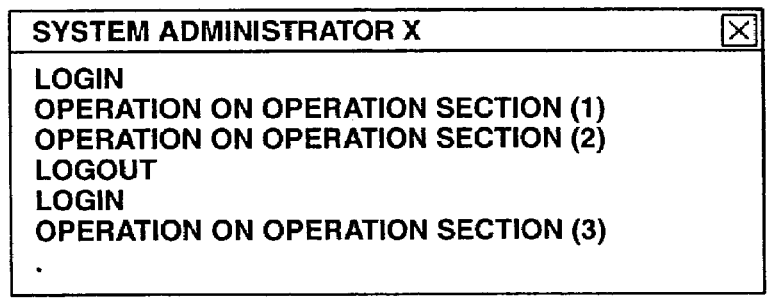

As described above, the log information analysis unit 9032 analyzes a series of setting operations performed by a system administrator from login to logout. In order to analyze a series of setting operations, the log information analysis unit 9032 extracts and classifies the log information about each system administrator from the collected log information about all system administrators, as shown in FIG. 11, and simplifies the information as show in FIG. 12. Alternatively, the log information analysis unit 9032 may extract a system administrator's setting operation sequence, and further extract the log information about each operation target, as shown in FIG. 13. In FIG. 13, the log information analysis unit 9032 consolidates "ID," "Starting Date," "Starting Time," "End Date," "End Time," "Time Zone," "Function," "Operation Means," and "Additional Information" for each operation target (FIG. 13(a)), and prepares an operation pattern by simplifying those information items in response to a system administrator's command (FIG. 13(b)).

Figure 14:
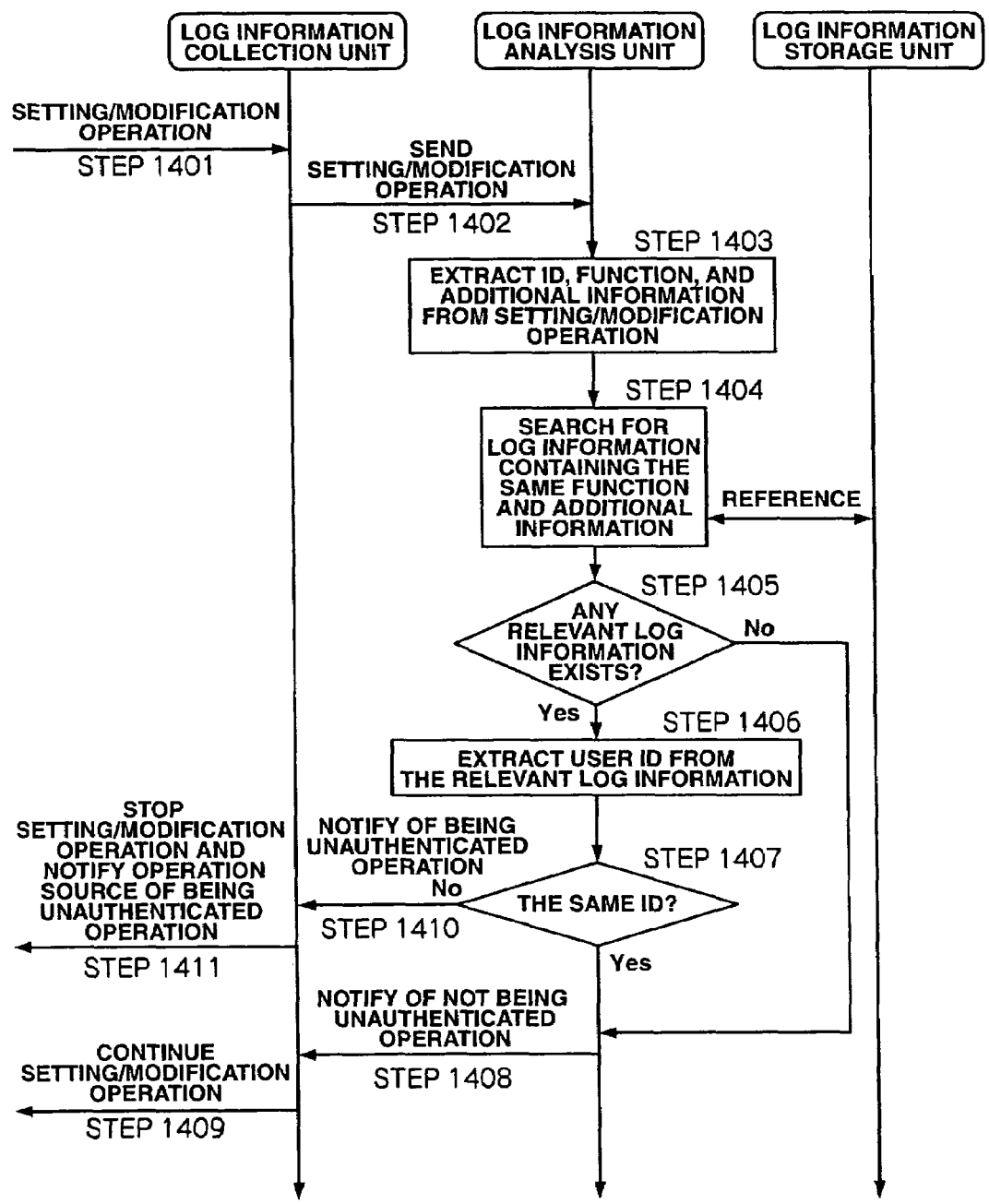
FIG. 14 is a sequence chart illustrating processing in a log information management module in a management apparatus according to an embodiment of the invention.

FIG. 14 is a sequence chart illustrating processing executed by the log information management module 903 in the management apparatus 43 according to an embodiment of the present invention.

As shown in FIG. 14, the log information collection unit 9011 in the log information management module 903, after accepting a setting operation (STEP 1401), sends it to the log information analysis unit 9032 (STEP 1402). The log information analysis unit 9032, after accepting the setting operation, extracts the system administrator's "ID," "Function" and "Additional Information" (STEP 1403). Next, the log information analysis unit 9032 refers to the log information storage unit 904 and searches the log information stored in the log information storage unit 904 for the log information containing the same "Function" and "Additional Information" as those extracted above (STEP 1404). If the log information analysis unit 9032 determines that the relevant log information exists (STEP 1405: YES), the log information analysis unit 9032 further searches the log information for the log information containing the "ID" extracted from the above searched log information (STEP 1406). If the log information analysis unit 9032 determines that the relevant log information exists (STEP 1407: YES), the log information analysis unit 9032 sends an analysis result indicating that the setting operation is not unauthenticated (STEP 1408). The log information collection unit 9011, after receiving the analysis result, notifies the storage setting module of setting operation execution (STEP 1409).

Even if no log information containing the same "Function" and "Additional Information" exists (STEP 1405: NO), the log information analysis unit 9032 sends the analysis result indicating that the operation is not unauthenticated to the log information collection unit 9011 (STEP 1408) because this operation is the system administrator's first setting operation.

Meanwhile, if no log information containing the same "ID" exists (STEP 1407: NO), the log information analysis unit 9032 sends an analysis result indicating that the operation is unauthenticated to the log information collection unit 9011 (STEP 1410). The log information collection unit 9011, after receiving the analysis result, notifies the storage setting module of the end of the setting operation (STEP 1411).

Next, a modified example of the log information collection/analysis function in the management apparatus 43 according to an embodiment of the invention will be described.

Figure 15:
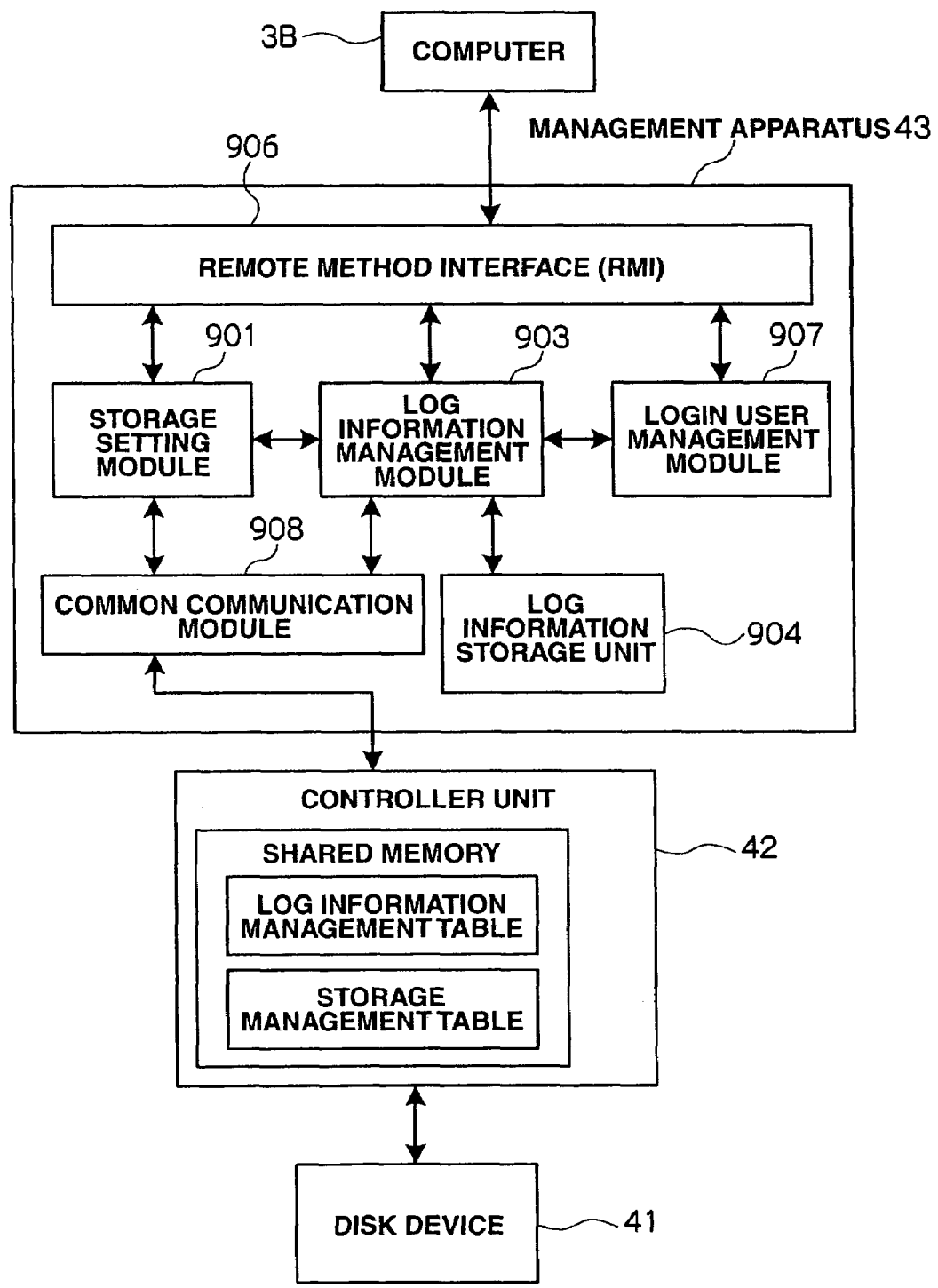
FIG. 15 is a block diagram illustrating a log information collection/analysis function in a storage system according to an embodiment of the invention.

FIG. 15 is a block diagram illustrating the log information collection/analysis function in the storage system 1 according to an embodiment of the invention. The log information collection analysis function in this example is achieved by the storage management program executed in the management apparatus 43 cooperating with various hardware resources. In this example, the setting operations performed from the computer 3B via a remote method interface (RMI) 906 in the management apparatus 43 are collected/analyzed.

Specifically, the log information collection/analysis function in the management apparatus 43 includes the storage setting module 901, log information management module 903, log information storage unit 904, RMI 906, login user management module 907, and common communication module 908.

The management apparatus 43 accepts logins from plural system administrators. For example, different system administrators can log in to the management apparatus 43 respectively from different computers 3B at the same time. If several system administrators have logged in, from the viewpoint of setting operations consistency, exclusive control is preferably adopted. For example, a system administrator who has first acquired the modification mode is allowed to conduct the system configuration setting operations for the storage apparatus 4, and other system administrators are allowed only to refer to the log information.

The login user management module 907 provides login IDs to each of the logged-in users (i.e., system administrators) in their order of login, and maintains the login IDs and corresponding user names. The RMI 906 calls the storage setting module 901 according to the setting operation performed by a logged-in system administrator. After accepting the login ID and the setting operation, the storage setting module 901 sends them to the log information management module 903 to receive permission for the setting operation. The log information management module 903, after receiving the above items, receives the correspondence information between the login ID and the user name, produces the log information based on that information, and stores the produced log information in the log information storage unit 904 and analyzes the log information. If the setting operation is not unauthenticated and permission is obtained from the log information management module 903, the storage setting module 901 sends the setting operation to the controller unit 42 via the common communication module 908. In this way, the system configuration information maintained in the storage management table in the shared memory 425 is updated.

Figure 16:
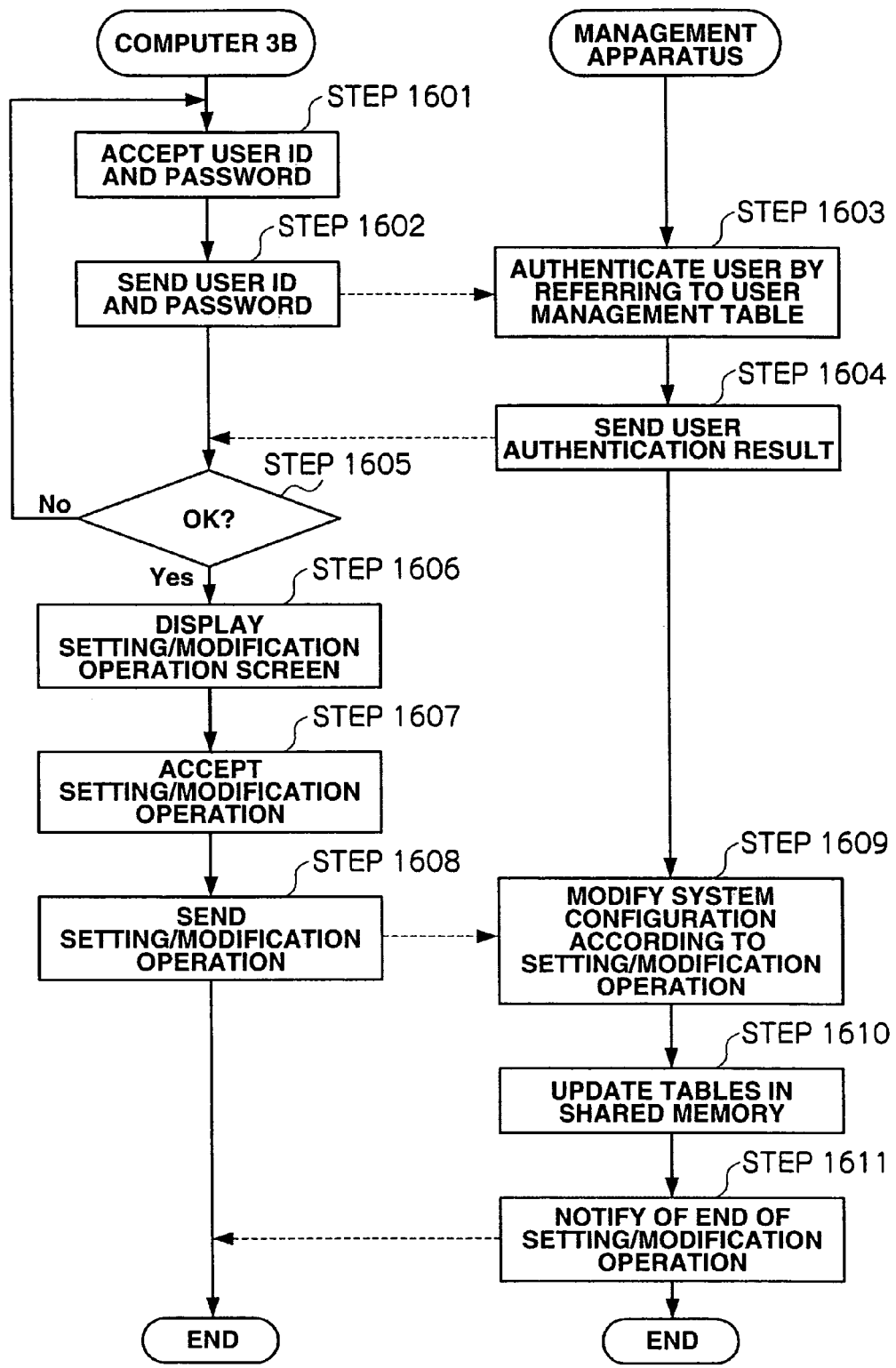
FIG. 16 is a flowchart illustrating processing performed during a setting operation for a storage apparatus according to an embodiment of the invention.

FIG. 16 is a flowchart illustrating processing during a setting operation for the storage apparatus 4 according to an embodiment of the invention. Although FIG. 16 only illustrates processing executed when the management apparatus 43 is operated from the user interface in the computer 3B, a person ordinary skilled in the art could understand the processing executed when the management apparatus 43 is operated from the computer 3A, or when setting operations are performed directly from the management apparatus 43.

First, the computer 3B displays a login screen on the user interface and urges a system administrator to input a user ID and password (STEP 1601). The computer 3B, after accepting the user ID and password, sends them to the management apparatus 43 via the network 2B (STEP 1602). The management apparatus 43 refers to the user management table in the memory 432 and authenticates the user (STEP 1603), and transmits the user authentication result to the computer 3B (STEP 1604).

Specifically, if the login has succeeded as a result of user authentication (STEP 1605: YES), the management apparatus 43 sends data concerning the setting operation screen to the computer 3B, and the setting operation screen is displayed on the user interface in the computer 3B (STEP 1606). By inputting predetermined parameters and selecting the "Apply" button in the setting operation screen (STEP 1607), a input setting operation request is sent to the management apparatus 43 (STEP 1608).

The management apparatus 43, after receiving the input setting operation request, collects and analyzes the log information, and performs the system configuration setting/modification according to the setting operation request (STEP 1609). The management apparatus 43 updates the content of each table in the shared memory 425 in response to the system configuration setting/modification (STEP 1610). After that, the management apparatus 43 notifies the computer 3B that the setting operation has ended (STEP 1611). The management apparatus 43 may also perform the above described setting operation navigation according to the analysis result.

A system administrator may perform setting operations for the storage system 4 via the channel adapter 422 using the storage management program executed in the computer 3A. The shared memory controller 426 receives, from the channel adapter 422, a setting command and a command concerning data access that has been made to the storage apparatus 4, stores the setting command with a setting means, modification date, and applied section in the log information management table 4254 in the shared memory 425, and transmits those items as log information to the management apparatus 43. If the channel adapter 422 receives a large number of commands from the computer 3A, or if the communication speed between the shared memory 424 and the management apparatus 43 is not sufficient, the log information may not be processed and the shared memory 425 may overflow. In that case, the shared memory controller 426 writes, to the dedicated logical volume 411a in the disk device 41, the log information that could not have been written to the shared memory 425. The log information written to the dedicated logical volume 411a is sent to the management apparatus 43 at the point in time when the management apparatus 43 can again receive the information.

As described above, the log information about the setting operations sent from a terminal other than the management apparatus 43 may be accumulated in the shared memory 425. In other words, log information about setting operations performed from the management apparatus 43 may be held in the management apparatus 43, and log information about setting operations performed from the computer 3A or 3B may be accumulated in the shared memory 425.

If a setting operation for the storage apparatus 4 is performed using the storage management program in the computer 3A, the shared memory controller 426 writes a received setting command as log information to the setting command management table 4253 in the shared memory 425. The shared memory controller 426 sets an 'execution impossible' status for the setting command to make it temporarily unable to be executed. The shared memory controller 426 sends the log information to the management apparatus 43. The management apparatus 43 collects and analyzes the log information, and sends the analysis result to the shared memory controller. 426. If, as a result of the analysis, the setting operation according to the setting command is regarded as not being unauthenticated, the shared memory controller 426 changes the setting command state to an execution possible state, and executes the setting command. Meanwhile, if the setting operation according to the setting command is regarded as being unauthenticated, the shared memory controller 426 cancels execution according to the setting command by deleting the setting command from the shared memory 425, and notifies the computer 3A of an execution failure. The log information regarded as being unauthenticated is stored in the log information storage unit 904 in the management apparatus 43.

FIG. 17 is a sequence chart illustrating processing executed by the log information management module 903 in the management apparatus 43 according to an embodiment of the invention.

Referring to FIG. 17, the shared memory controller, after receiving a setting command via the channel adapter 422 (STEP 1701), checks the free area in the shared memory 425 (STEP 1702). If the shared memory controller 426 ds that the free area in the shared memory 425 is at a predetermined threshold value or more (STEP 1703: YES), the shared memory controller 426 writes log information based on the setting command to the shared memory (STEP 1704).

In contrast, if the shared memory 426 does not have sufficient free area (STEP 1703: NO), the shared memory controller 426 writes the setting command to the shared memory 425 and writes the log information to the cache memory 421 (STEP 1705).

The disk adapter 428 monitors the shared memory 425. If the disk adapter 428 detects that the setting command has been written to the shared memory 425, the disk adapter 428 reads the setting command from the shared memory 425 (STEP 1706) and reads the log information written to the cache memory (STEP 1707). Subsequently, the disk adapter 428 stores the setting command and the log information in association with each other in the dedicated logical volume 411a (STEP 1708). The disk adapter 428 then deletes the log information stored in the cache memory 421 (STEP 1709) and deletes the setting command stored in the setting command management table 4253 in the cache memory 425 (STEP 1710).

As a result of the various configurations described in detail above, embodiments of the invention may include one or more following advantages, some of which have been discussed above.

According to the above described embodiments, the operation log information for each system administrator is collected and analyzed. Accordingly, when and what kind of modification a system administrator has made with what kind of means, and to which resource in the storage system can be easily understood. Moreover, based on the analysis result, unauthenticated or unauthenticated operations, such as unintended delete or modification of setting items by a system administrator can be prevented.

According to the above described embodiment, as the operation log information for each system administrator is collected and analyzed, subsequent setting operations can be predicted, and optimum navigation can be provided to each system administrator. Accordingly, the burden on system administrators when performing setting operations can be reduced.

According to the above described embodiment, operation log information for each system administrator is collected and analyzed, and provided to system administrators after organizing the information in chronological order. Accordingly, the state of the storage system, which varies from hour to hour can easily be understood.

The present invention can be widely applied in storage apparatuses that store data processed in a computer system. More particularly, the invention can be applied in storage apparatuses in which setting operations can be provided via a network.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A storage apparatus comprising,
   a disk device including a recording medium for storing data;
   a controller unit configured to control the disk device;
   a setting unit configured to accept a setting operation for the disk device performed by a user and configure a setting according to the setting operation;
   a log information collection unit configured to collect, as log information, the setting operations accepted by the setting unit;
   a log information analysis unit configured to perform predetermined analysis processing on the setting operation based on the log information collected by the log information collection unit; and
   a log information storage unit configured to store the log information collected by the log information collection unit;
   wherein the log information analysis unit performs the predetermined analysis processing based on the log information stored in the log information storage unit, determines whether or not to permit the setting operation performed by the user based on the log information stored in the log information storage unit, and produces a past operation pattern and a latest operation pattern for the user based on the log information stored in the log information storage unit, and determines whether or not to permit the setting operation performed by the user.

2. The storage apparatus according to claim 1, wherein the log information analysis unit produces a log information graph arranged in chronological order based on the log information stored in the log information storage unit, and outputs the log information graph.

3. The storage apparatus according to claim 2, wherein the log information includes plural types of log information and displayed separately.

4. A storage apparatus comprising:
   a disk device including a recording medium for storing data;
   a controller unit configured to control the disk device;
   a setting unit configured to accept a setting operation for the disk device performed by a user and configure a setting according to the setting operation;
   a log information collection unit configured to collect, as log information, the setting operations accented by the setting unit;
   a log information analysis unit configured to perform predetermined analysis processing on the setting operation based on the log information collected by the log information collection unit;
   a log information storage unit configured to store the log information collected by the log information collection unit;
   an operation routine setting unit configured to set, for the user, a pattern of setting operations;
   and a pattern storage unit configured to store the pattern of setting operations set by the operation routine setting unit;
   wherein the pattern storage unit stores a pattern for a procedure for selling operations for the user, and the log information analysis unit presents, to the user, the subsequent setting operation in the setting operations based on the pattern of the procedure for the setting operations stored in the pattern storage unit.

5. The storage apparatus according to claim 4, wherein the log information analysis unit produces a log information graph arranged in chronological order based on the log information stored in the log information storage unit, and outputs the log information graph.

6. The storage apparatus according to claim 5, wherein the log information includes plural types of log information and displayed separately.

7. The storage apparatus according to claim 4, wherein the log information analysis unit determines whether or not to permit the setting operation performed by the user based on the setting operation pattern stored in the pattern storage unit.

8. The storage apparatus according to claim 7, wherein the log information analysis unit performs the predetermined analysis processing based on the log information stored in the log information storage unit.

9. A storage apparatus comprising:
   a disk device including a recording medium for storing data;
   a controller unit configured to control the disk device;
   a setting unit configured to accept a setting operation for the disk device performed by a user and configure a setting according to the setting operation;
   a log information collection unit configured to collect, as log information, the setting operations accepted by the setting unit;
   a log information analysis unit configured to perform predetermined analysis processing on the setting operation based on the log information collected by the log information collection unit;
   a log information storage unit configured to store the log information collected by the log information collection unit;
   an operation routine setting unit configured to set, for the user, a pattern of setting operations;
   and a pattern storage unit, configured to store the pattern of setting operations set by the operation routine selling unit;
   wherein the log information analysis unit produces a past operation pattern and a latest operation pattern for the user based on the log information stored in the log information storage unit, and presents, to the user, the subsequent setting operation in the setting operations based on the past and latest operation patterns.

10. The storage apparatus according to claim 9, wherein the log information analysis unit produces a log information graph arranged in chronological order based on the log information stored in the log information storage unit, and outputs the log information graph.

11. The storage apparatus according to claim 10, wherein the log information includes plural types of log information and displayed separately.

12. The storage apparatus according to claim 9, wherein the log information analysis unit determines whether or not to permit the setting operation performed by the user based on the setting operation pattern stored in the pattern storage unit.

13. The storage apparatus according to claim 12, wherein the log information analysis unit performs the predetermined analysis processing based on the log information stored in the log information storage unit.

14. A setting method storage apparatus including a disk device having a storage medium for storing data and a controller unit configured to control the disk device, the method comprising;
   accepting a setting operation for the disk device performed by a user;
   collecting the accepted selling operation as log information;
   performing predetermined analysis processing on the setting operation based on the collected log information;
   storing the collected log; and
   performing processing according to the setting operation based on the result of the predetermined analysis processing;
   wherein the step of performing predetermined analysis processing further comprises determining whether or not to permit the selling operation performed by the user based on the stored log information, producing a past operation pattern and a latest operation pattern for the user based on the stored log information, and determining whether or not to permit the setting operation performed by the user based on the past and latest operation patterns.

* * * * *